United States Patent [19]

Fiala

[11] 3,857,528
[45] Dec. 31, 1974

[54] SAFETY BELT REEL WITH TORSION ROD

[75] Inventor: Ernst Fiala, Braunschweig-Querum, Germany

[73] Assignee: Wolf-Dieter Klink, Lindach, Germany

[22] Filed: May 8, 1973

[21] Appl. No.: 358,289

[30] Foreign Application Priority Data
May 9, 1972 Germany............................ 2222742

[52] U.S. Cl. ........................ 242/107.4, 280/150 SB
[51] Int. Cl............................................. B65h 75/48
[58] Field of Search ............ 242/107, 75.4, 156, 85, 242/107.4; 297/386, 387, 388; 280/150 SB; 267/154

[56] References Cited
UNITED STATES PATENTS
| | | | |
|---|---|---|---|
| 3,442,466 | 5/1969 | Fritsche | 242/107.4 |
| 3,561,690 | 2/1971 | Muskat | 242/156 |

*Primary Examiner*—Billy S. Taylor
*Attorney, Agent, or Firm*—Herbert L. Lerner

[57] ABSTRACT

Energy converter for motor vehicle safety belts having a belt wind-up drum in the hollow interior of which a torsion rod is mounted, includes a rigid tube surrounding the torsion rod and having a peripheral wall disposed between the torsion rod and the inner surface of the belt wind-up drum for limiting bending of the torsion rod.

5 Claims, 1 Drawing Figure

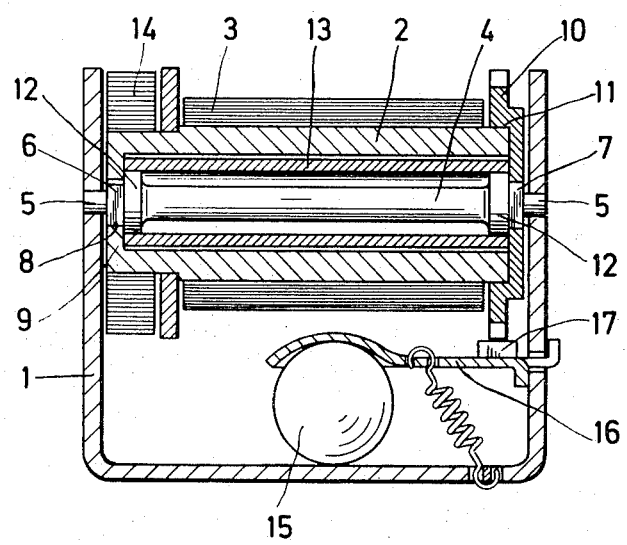

SAFETY BELT REEL WITH TORSION ROD

The invention of the instant application relates to an energy converter, and more particularly to an energy converter for motor vehicle safety belts of the type having a belt wind-up drum in the hollow interior of which a torsion rod is mounted.

Heretofore known energy converters of this general type are economically constructed and have a virtually ideal converter characteristic as shown in my copending U.S. Pat. No. 3,741,494, granted, June 26, 1973. It can happen, however, in exceptional cases, that the torsion rod will bend to such an extent under extreme loading that it will come into engagement with the inner surface of the belt wind-up drum and exert a braking action thereon. An undesired variation in the converter characteristic is thereby produced.

It is accordingly an object of the invention to provide an energy converter that will prevent at low cost extreme bending of a torsion rod in the belt wind-up drum of a motor vehicle safety belt.

With the foregoing and other objects in view, there is provided in accordance with the invention, an energy converter for motor vehicle safety belts having a belt wind-up drum in the hollow interior of which a torsion rod is mounted, comprising a rigid tube surrounding the torsion rod and having a peripheral wall disposed between the torsion rod and the inner surface of the belt wind-up drum for limiting bending of the torsion rod.

In accordance with other features of the invention, the tube is mounted with play within the hollow safety belt wind-up drum. The tube has an inner diameter that corresponds to the diameter of the torsion rod. The torsion rod is formed with at least one collar having a diameter corresponding to the inner diameter of the tube. An embodiment wherein the torsion rod is formed with one or more collars is especially employed when the ends of the torsion rod do not have a circular cross section, for example, if they are of rectangular or square cross section.

In accordance with another feature of the invention, the torsion rod has means defining a rotary shaft for the belt wind-up drum. The safety belt wind-up drum may also be provided with a locking device that is responsive or actuated upon braking or deceleration of the motor vehicle or when the belt is very rapidly pulled.

Other features which are considered as characteristic for the invention are set forth in the appended claims.

Although the invention is illustrated and described herein as embodied in energy converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying single FIGURE of the drawing which is a cross-sectional view of the energy converter of the invention assembled in a safety belt.

Referring now to the drawing, there is shown therein a safety belt device having a bearing bracket 1 in which a wind-up drum 2 is mounted, with a belt 3 of the safety belt device wound thereon. A torsion rod 4 serves as rotary shaft for the belt wind-up drum 2 and has bearing pins 5 that are journalled in the bearing bracket 1. The torsion rod 4 is formed with portions 6 and 7 of rectangular cross section located in the vicinity of the bearing pins 5. The rectangular portion 6 is received in an opening 8 of corresponding geometrical shape that is provided in the end wall 9 of the belt wind-up drum, while a gear 10 is non-rotatably seated on the rectangular portion 7 of the torsion rod 4, the gear 10 forming a bearing 11 externally surrounding the belt wind-up drum 2. The torsion rod 4 is formed with respective annular collars 12 in the vicinity of the rectangular portions 6 and 7. A rigid tube 13 is slid over the torsion rod 4 and engages with the annular collars 12 of the latter. The outer diameter of the tube 13 is chosen so that adequate play remains between the tube 13 and the inner surface of the belt wind-up drum 2 for rotating the drum 2 with respect to the tube 13.

During normal operation, the belt 3 can be withdrawn or unwound as needed from the drum 2, a spring 14 being accordingly stressed so that the belt 3, when relieved of tension, is rewound automatically on the drum 2. To lock and prevent the belt from being unwound in the event of an accident, a ball 15 acting as an inertia member is provided and cooperates with a spring-loaded locking lever 16 which is formed with a nose 17 that engages in or meshes with the gear 10 when the ball 15 is deflected. In this case, which occurs when there is a sharp deceleration of the motor vehicle speed, for example due to heavy braking or impact, the torsion rod 4 loses its function as rotary shaft of the belt wind-up drum 2, since the gear 10 is secured in position by the locking lever 16. The tensile force acting on the belt 3 is transmitted through the belt wind-up drum 2 to the torsion rod 4, which is then firmly clamped at one side thereof, and twists or is subjected to torsion in accordance with the force acting thereon. Thus, the kinetic energy of an occupant secured by the belt 3 is converted into deforming work so that the belt forces exerted on the body of the secured occupant can be kept within acceptable limits. In useful applications which permit a different construction of the ends of the torsion rod 4, the annular collars 12 can be dispensed with within the scope of the invention. Under this assumption or condition, the inner diameter of the tube 13 can be selected so that it substantially corresponds to the diameter of the torsion rod 4.

I claim:

1. In a safety belt wind-up device having a belt wind-up drum with a hollow interior, an energy conversion device comprising a torsion rod mounted in the hollow interior of the wind-up drum and having a first and second ends corresponding to respective first and second ends of the wind-up drum, means for rigidly connecting said first end of said torsion rod to the corresponding first end of the wind-up drum, the second end of the wind-up drum being freely rotatable, means actuable for anchoring said torsion rod against rotation at said second end thereof so that when said second end of said torsion rod is anchored against rotation, said torsion rod absorbs energy by torsion of said first end thereof relative to said anchored second end thereof, a rigid tube surrounding said torsion rod and having a peripheral wall disposed between said torsion rod and the inner surface of the belt wind-up drum for limiting bending of said torsion rod and for preventing a bent torsion rod from jamming against the drum and interfering with the energy conversion characteristics of said torsion rod.

2. Energy converter according to claim 1, wherein said tube is mounted with play within the belt wind-up drum.

3. Energy converter according to claim 1, wherein said tube has an inner diameter corresponding to the diameter of the torsion rod.

4. Energy converter according to claim 1, wherein the torsion rod is formed with at least one collar having a diameter corresponding to the inner diameter of said tube.

5. Energy converter according to claim 1, wherein the torsion rod has means defining a rotary shaft for the belt wind-up drum.

* * * * *